United States Patent
Watanuki et al.

[11] Patent Number: 5,233,879
[45] Date of Patent: Aug. 10, 1993

[54] ACTUATOR

[75] Inventors: Yoshio Watanuki; Haruo Mochida; Masaru Inoue; Kazuya Suzuki; Masaki Tanaka, all of Yokohama, Japan

[73] Assignees: Nissan Motor Company Ltd.; Jidosha Denki K.K., both of Kanagawa, Japan

[21] Appl. No.: 450,503

[22] Filed: Dec. 14, 1989

[30] Foreign Application Priority Data

Dec. 15, 1988 [JP] Japan .............................. 63-162569[U]

[51] Int. Cl.⁵ .......................... F16H 1/16; F16H 29/20
[52] U.S. Cl. ...................................... 74/425; 74/89.14; 403/334
[58] Field of Search ............... 74/425, 89.14; 403/383, 403/334

[56] References Cited

U.S. PATENT DOCUMENTS

| | | | |
|---|---|---|---|
| 1,327,567 | 1/1920 | Miles | 74/425 X |
| 2,038,731 | 4/1936 | Gunderson | 74/425 |
| 2,641,139 | 6/1953 | Beisner | 74/425 |
| 4,813,303 | 3/1989 | Beezer et al. | 74/425 |

FOREIGN PATENT DOCUMENTS 60-59278 4/1985 Japan .

Primary Examiner—Allan D. Herrmann
Assistant Examiner—Julie Krolikowski
Attorney, Agent, or Firm—Sughrue, Mion, Zinn, Macpeak & Seas

[57] ABSTRACT

An actuator includes a worm provided with a shaft-engaging hole, a motor provided with a shaft having a worm-engaging part for detachably engaging the shaft-engaging hole of the worm and an end cover having a worm-supporting hole for rotatably supporting at least one end of the worm whereby it is possible to provide a compact actuator which is easy to assemble. The motor and worm are supported between upper and lower complementary casings.

2 Claims, 5 Drawing Sheets

ACTUATOR

BACKGROUND OF THE INVENTION

1. Field of the Invention

This invention relates to an actuator used, for example, for door locking system which may lock or unlock a door automatically.

2. Description of The Prior Art

Heretofore, there has been used an actuator as shown in FIG. 7 of the present application corresponding to Japanese Patent Disclosure No. 60-59278/851.

An actuator 100 shown in the figure is fitted with a motor 102 in a motor fitting pat 101a provided in casing 101. The motor 102 is installed in the casing 101 by pressing a bar 103 onto an end cover 102a of the motor 102 and driving screws 104 through the bar 103 into the casing 101.

A pinion 105 is force-fitted onto the shaft 102b protruding from said end cover 102a, and is meshed with a larger gear part 106a of an intermediate gear 106 which has the larger part 106a and a smaller gear part 106b as one body and supported rotatably by an intermediate shaft 107.

A sector wheel 109 is fixed to an output shaft 108 supported rotatably by the casing 101, and the smaller gear part 106b of the intermediate gear 106 is meshed with said sector wheel 109.

Additionally, a swing arm 110 is fixed to the output shaft 108 on the outside of the casing 101 so as to transmit the output of this actuator 100 to the outside.

Upon supplying a prescribed electric current to the motor 102 through a terminal 102c or 102d, the shaft 102b of the motor 102 rotates in the forward or reverse direction.

By the rotation o the shaft 102b of the motor 102 in forward direction, the power o the shaft 102b is transmitted to the sector wheel 109 from the pinion 105 through the larger gear part 106a and the smaller gear part 106b of the intermediate gear 106, and the sector wheel 109 engages the damper 111 provided on the casing 101. The sector wheel 109 engages another damper 112 when shaft 102b of the motor 102 rotates in the reverse direction. The sector wheel 109 rotates oscillatively in the range in which the sector wheel 109 is out of contact with either damper 111 or 112.

Thereby the swing arm 110 functions, a door (not shown) is locked and unlocked by getting a door lock rod 113 up and down which is connected with said swing arm 110.

However, in the conventional actuator 100 as mentioned above, because the motor 102 is installed in the casing by pressing the bar 103 onto the end cover 102a and driving the screws 104 through the bar 103 into the casing 101 after fitting the motor 102 into the motor fitting pat 101a provided in the casing 101, there is a problem in that it is difficult to incorporate the motor 102 into the casing 101. Furthermore, there is another problem in that it is not possible to make the actuator 100 compact since the longitudinal direction of the shaft 102b and the direction of the thickness of the actuator 100 are the same. As a result, there has been a demand to provide an actuator which is compact and easy to incorporate into the casing 101.

SUMMARY OF THE INVENTION

This invention is made in view of the above mentioned problems of the prior art as a result of particular considerations of the structure with the object of providing a compact actuator which is easy to incorporate.

The construction of the actuator according to this invention for accomplishing the above-mentioned object is characterized by having a motor which is provided with an end cover and a shaft protruding from said end cover with a worm attached to said shaft, wherein said worm has a shaft-engaging hole, said shaft has a worm-engaging part for engaging detachably into said shaft-engaging hoe, and said end cover has a worm-supporting hole for supporting rotatably at least one end of said worm.

The actuator according to this invention is provided with the shaft-engaging hole in the worm, with the worm-engaging part to the shaft detachably engaged with the worm, with the worm-supporting hole in the end cover for supporting rotatably at least one end of the worm, and with the motor secured between the upper and lower casings. Therefore, said actuator is so designed as to incorporate easily the worm and the motor into the casing and as to be made compact.

BRIEF DESCRIPTION OF THE DRAWINGS

FIG. 5 is a top plan view of the actuator according to another embodiment of this invention with the upper casing removed;

FIG. 6 is a perspective view of the respective parts showing assembling relations of the worm and the motor of the actuator shown in FIG. 5.

DESCRIPTION OF THE PREFERRED EMBODIMENT

Figure 1:
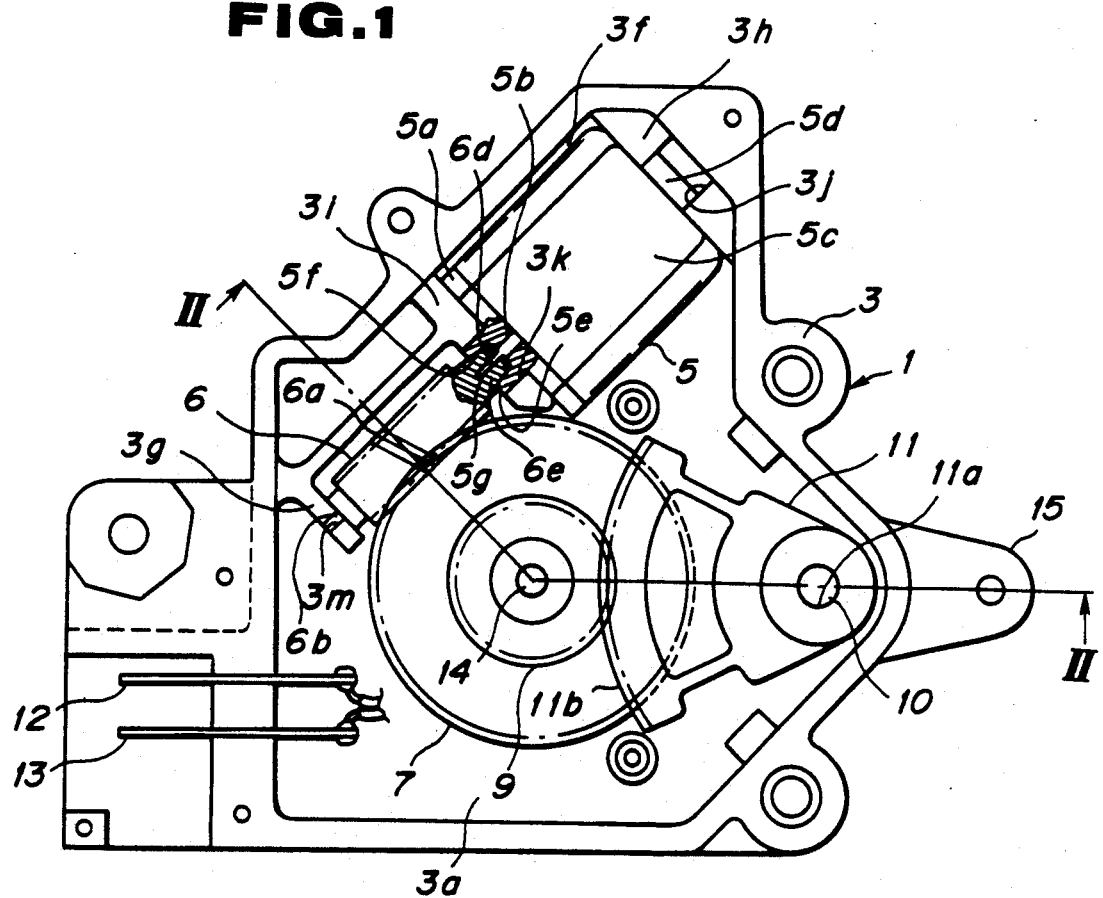
FIG. 1 is a top plan view of the actuator according to an embodiment of this invention with the upper casing removed.

A first embodiment of the actuator according to this invention is shown in FIG. 1 to FIG. 4.

An actuator 1 as shown comprises principally a casing 4 consisting of an upper casing 2 and a lower casing 3, a motor 5 having a shaft 5b protruding from an end cover 5a, a worm 6 attached to said shaft 5b a worm wheel 7 meshed with said worm 6, a pinion 9 for receiving rotation of the worm wheel 7 through a clutch mechanism 8 and a sector wheel 11 meshed with the pinion 9 and fixed to an output shaft 10.

the upper casing 2 and the lower casing 3 are assembled in a body by putting the respective opening together.

The lower casing 3 is provided with a projecting shaft-fitting part 3b in the center part of a bottom plate 3a, and an annular protrusion 3c on the outside of said shaft-fitting part 3b.

Figure 2:
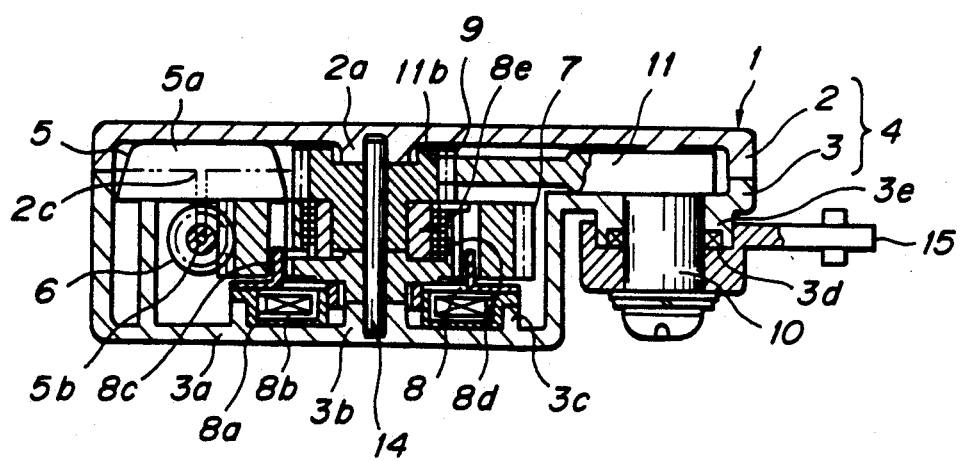
FIG. 2 is a vertical sectional side view along section lines II—II of the actuator shown in FIG. 1 in the covered state with the upper casing.

The lower casing 3 is provided on the right side in FIG. 2 with a bearing part 3a having an opening therethrough and having a seal 3d on the inner periphery, and with a motor-fitting part 3f and a worm-setting wall 3g on the upside in FIG. 1.

The motor-fitting part 3f comprised a motor casing-contacting wall 3h and an end cover-contacting wall 3i protruding respectively in the upward direction in FIG. 1 from the bottom plate 3a of the lower casing 3. The motor casing-contacting wall 3h has a cutout 3j for holding the projecting end 5d of a motor casing 5c provided to the motor 5 described later and the end cover-contacting wall 3i has a cutout 3k for holding a projecting part 5e of the end cover 5a provided to the motor 5 described later.

The worm-setting wall 3g protrudes upwardly in FIG. 1 from the bottom plate 3a of the lower casing 3 in the same manner as said respective contacting walls 3h and 3i, and is provided with a bearing pat 3m for rotatably supporting the one end of worm 6 described later.

Figure 4:
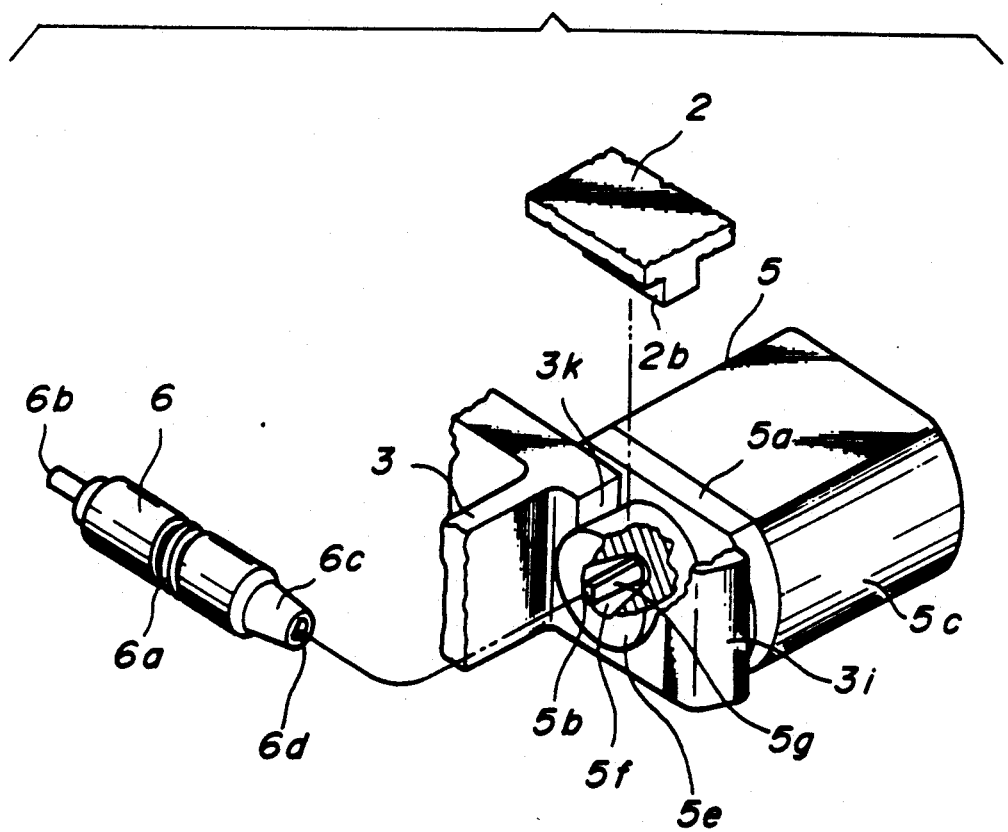
FIG. 4 is a perspective view of the respective parts showing assembling relations of the worm and the motor of the actuator shown in FIG. 1.
Figure 7:
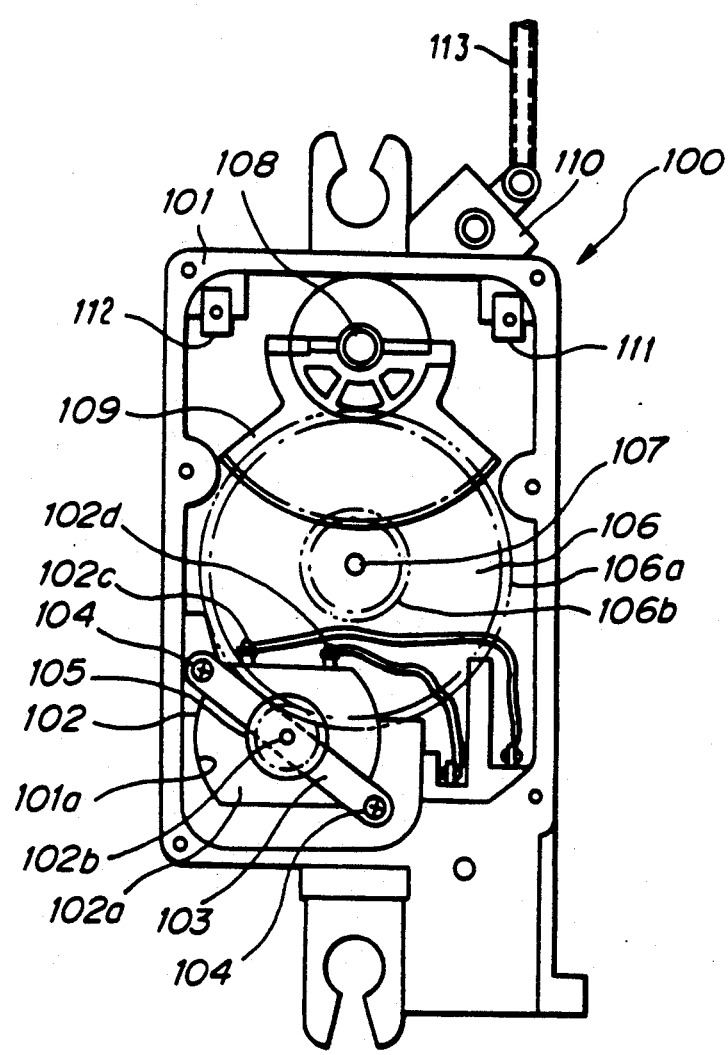
FIG. 7 is a top plan view of the conventional actuator.

The upper casing 2 is provided with a shaft-supporting part 2a opening in the downward direction in FIG. 2 at a position corresponding o the shaft-fitting part 3b provided to said lower casing 3, and is provided with a stop wall 2b functioning as a stopper of the end cover 5a by fitting into the cutout 3k provided to the end over-contacting wall 3i of said lower casing 3 as shown in FIG. 4, and with a stop wall 2c functioning as a stopper of one end of the worm 6 by fitting into the bearing pat 3m provided to the worm-setting wall 3g of said lower casing 3 as shown in FIG. 1.

On the one side, the motor 5 is a direct current motor rotatable in forward and reverse directions by supplying a current changably through the connector terminals 12 and 13, and is provided with the end cover 5-a and the motor casing 5c fitting on said end cover 5a, and with the rotatable shaft 5b protruding outwardly from end cover 5a.

The end cover 5a is provided with the projecting part 5e projecting on the protruding side of the shaft as shown in FIG. 1, and with a worm-supporting hole 5f on the end wall of said projecting part 5e which is bottomed and spreads toward the protruding directions of the shaft 5b to support rotatably another end of the worm 6 described later.

The end cover-contacting wall 31 is so designed as to hole the end cover 5a by fitting said projecting part 5e into the cutout 3k provided on the end cover-contacting wall 3i of said lower casing 3.

The motor casing 5c is provided with the projecting end 5d projecting form the end of said motor casing 5c as shown in FIG. 1 and is held by fitting said projecting end 5d into the cutout 3j provided on the motor casing-contacting wall 3h of said lower casing 3.

The shaft 5b protruding from the end cover 5a is provided with a worm-engaging part 5g for engaging detachably with the worm 6 described later to the end part thereof, which is a flat shaped cutout in this embodiment.

On the other side, the worm 6 is provided with a gear part 6a, a shaft portion 6b on one end side to be inserted into the bearing part 3m provided to the worm-setting wall 3g of said lower casing 3, and a shaft portion 6c on another end side to be inserted into the worm-supporting hole 5f provided to said end cover 5.

The one end-shaft portion 6b has an external shape to be supported rotatably in an inserted state in the bearing part 3m provided to the worm-setting wall 3g of the lower casing 3.

Another end-shaft portion 6c has an external shape to be supported rotatably in an inserted state in the worm-supporting hole 5f provided to the end cover 5a, and is provided at the center part thereof with a shaft-engaging hole 6d deepened along the longitudinal direction of said worm 6 and having a shape to be engaged detachably with the worm-engaging part 5g provided to said shaft 5b.

Figure 3:
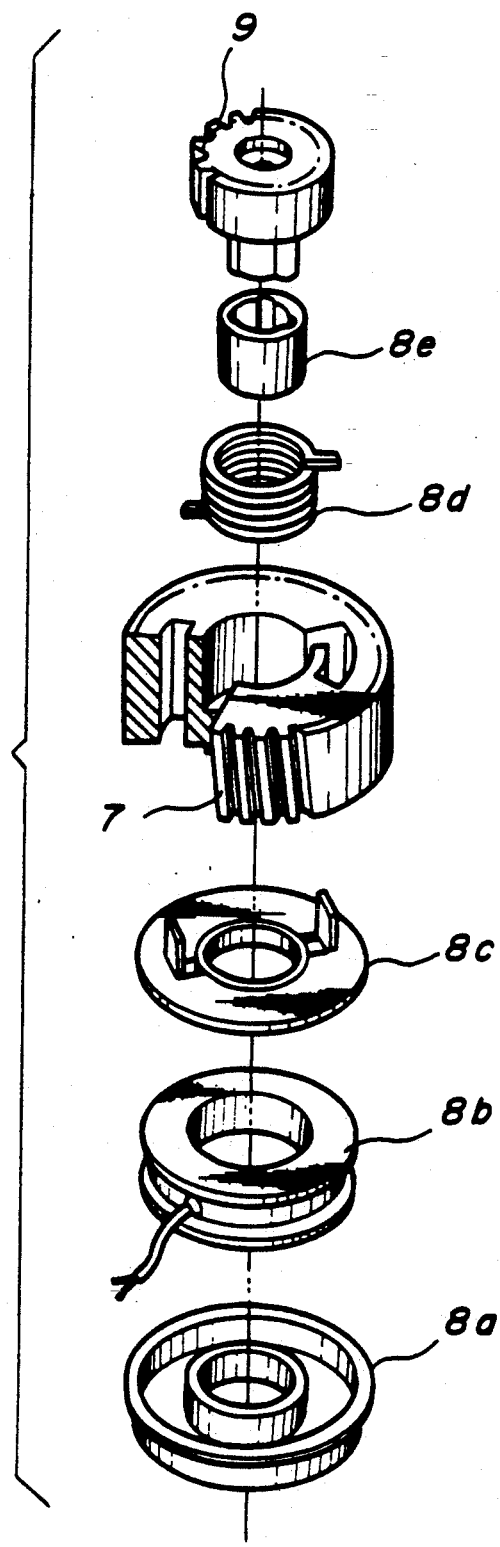
FIG. 3 is a respective view of the respective parts showing assembling relations of the pinion, the worm wheel and the clutch mechanism of the actuator shown in FIG. 1.

The worm wheel 7 is meshed with said worm 6, and is fitted with the clutch mechanism 8 in the center part, and on the lower side in FIG. 3 for transmitting the rotation of said worm wheel 7 to the pinion 9.

The clutch mechanism 8 comprises, as shown in FIG. 3, a yoke 8a, a coil 8b connected electrically to the connector terminals 12 and 13, a clutch late 8c attracted to the coil 8b by the excitation of the coil 8b, a clutch spring 8d engaged with the worm wheel 7 at one end and engaged, with the clutch plate 8c at another end thereof, and a sleeve 8e engaged with the pinion 9 housed on the inside of the clutch spring 8d.

As shown in FIG. 2, the yoke 8a and the coil 8b are housed in the annular protrusion 3c provided to the lower casing 3, an intermediate shaft 14 is fitted into the shaft-fitting part 3b provided to the lower casing 3 and the clutch plate 8c is fitted on the upper side of the coil 8b in the figure.

Hereupon, when the coil 8b is excited, the coil 8b attracts the clutch plate 8c and the rotation of said clutch plate 8c is restricted. Thereby, the clutch spring 8d engaged with an end of said clutch plate 8c is wound around the sleeve 8e, so that the worm wheel 7 and the pinion 9 come to rotate as a united body.

when the coil 8b is demagnetized, the clutch plate 8c becomes free and the clutch spring 8c does not wind around the sleeve 8e, therefore the worm wheel 7 and the pinion 9 become free and independent from each other.

Additionally, the sector wheel 11 is meshed with said pinon 9 and fixed to the output shaft 10.

Said sector wheel 11 is provided with an output shaft-fitting hole 11a on the right side in FIG. 1 and with toothed part 11b on the left side in FIG. 1.

The output shaft 10 is supported rotatably by a bearing 3e provided to the lower casing 3, is fitted into an output shaft-fitting hole 112a provided to said sector wheel at the upper end thereof in FIG. 2 and is fixed to a swing arm 15 to be connected with a rod of a door lock (not shown) at the lower end thereof in FIG. 2.

concerning the incorporating of the motor 5 and the worm 6 into the casing 4, first of all, the worm-engaging part 5g provided to the shaft 6b of the motor 5 is engaged into the shaft-engaging hole 6d provided to the another end-shaft part 6c of the worm 67 and said another end-shaft part 6c is inserted into the worm-supporting hole 5f provided to the end cover 5a of the motor 5 after inserting the one end-shaft part 6b of the worm into the bearing part 3m provided to the worm-setting wall 3g of the lower casing 3. Subsequently, the worm 6 and the motor 5 are mounted in the lower casing 3 as one united body by fitting the projecting pat 5e provided to the end cover 5a of the motor 5 into the cutout 3k provided to the end over-contacting wall 3i of the lower casing 3 and fitting the projecting end 5d provided to the motor casing 5c of the motor 5 into the cutout 3j provided to the motor casing-contacting wall 3h of the lower casing 3.

Next, the working of the actuator 1 according to this invention will e described below.

In the first place, applying an electric current through either connector terminal 12 or 13, the shaft 5b of the motor 5 rotates and the coil 8b is excited.

By the rotation of the shaft 5b, the worm 6 engaged with said shaft 5b rotates, thereby the worm wheel 7 rotates.

At this time, the coil 8b is excited and the clutch plate 8c is attracted by the coil 8b, so that the clutch spring 8d engaged with the end of said clutch plate 8c is wound around the sleeve 8e by the rotation of the worm wheel 7.

Thereby, the rotation of the worm wheel 7 is transmitted to the pinion 9 and rotates the sector wheel 11, and so the swing arm 15 moves rotatively.

According to the movement of the swing arm 15, the rod of the door lock connected to said swing arm 15 is driven and the door is locked or unlocked.

Therefore, in this case, it is possible to connect easily the worm 6 with the motor 5 and impossible to disconnect the worm 6 from the motor 5 very easily. Accordingly a worm 6 having a relatively large diameter is also available.

Figures 5, 6:
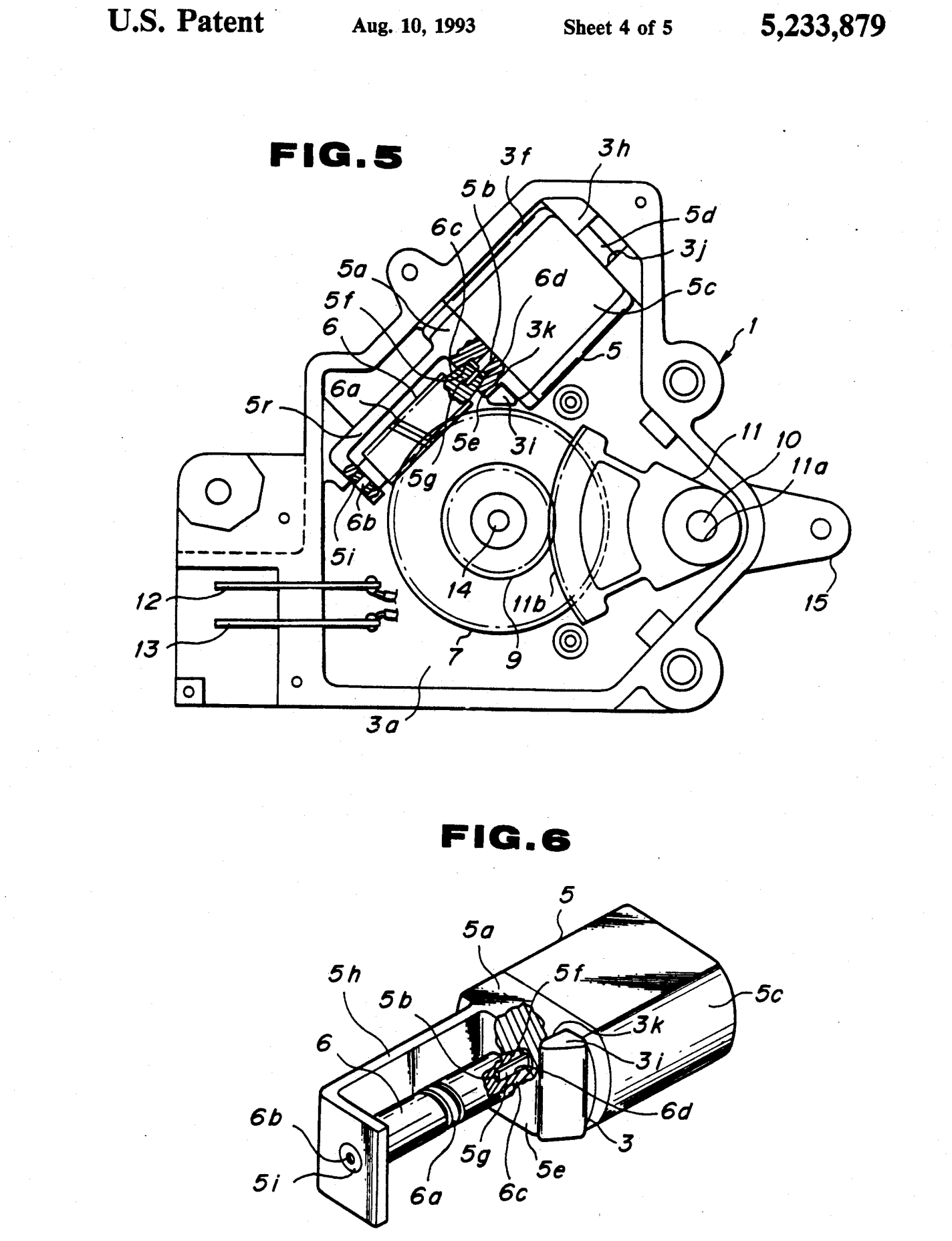

Another embodiment of the actuator according to this invention is shown in FIG. 5 and FIG. 6.

In the actual 1 according to this embodiment, the end cover 5a o the motor 5 is provided with a protrusion 5h protruding in the same direction with the protruding direction f the shaft 5b, and said protrusion 5h is provided with a worm-supporting hole 5i to support endshaft part 6b of the worm 6 to the end portion thereof. With the exception of the above mentioned part, the structure of the actuator according to this embodiment is the same as that of afore-mentioned embodiment.

In this case, the one end-shaft part 6b of the worm 6 s supported by the worm-supporting hole 5i provided to the protrusion 5h of the end cover 5a, and the another end-shaft part 6c of the worm 6 is supported by the worm-supporting hole 5f provided to the end cover 5a, furthermore the worm 6 is engaged detachably with shaft 5b of the motor 5. Accordingly, it is suitable for the worm 6 having a comparatively smaller diameter.

As mentioned above, the actuator according to this invention has a motor which is provided with an end cover and a shaft having a worm engaging part protruding from said end cover, a worm has a shaft-engaging hole for detachably receiving the worm-engaging part and said end cover has a worm-supporting hole for supporting rotatably at least one end of said worm. Therefore, an excellent effect can be obtained since it is possible to provide an actuator which is compact and easy to incorporate into casing having upper and lower parts.

What is claimed is:

1. An actuator comprising:
   a motor provided with an nd cover having a worm-supporting hole therein and with a shaft having a worm-engaging part protruding from said end cover through said hole;
   a worm having one end rotatably supported in said worm-supporting hole with a shaft engaging hole therein for detachably receiving said worm engaging part of said shaft therein; and
   a casing comprised of an upper casing and a lower casing with support means for supporting said motor between said upper and lower casings, wherein said worm-supporting hole of said end cover has a conical shape flared outwardly away from said motor and said one end of said worm is provided with a tapered shaft complementary to the conical shape of said hole.

2. An actuator as set forth in claim 1, wherein said end cover is comprised of a base part provided with said worm-supporting hole and a protruding part provided with another worm-supporting hole for rotatably supporting an opposite end of said worm.

* * * * *